United States Patent [19]

Nassimbene

[11] 4,032,889
[45] June 28, 1977

[54] PALM PRINT IDENTIFICATION

[75] Inventor: Ernie George Nassimbene, Los Gatos, Calif.

[73] Assignee: International Business Machines Corporation, Armonk, N.Y.

[22] Filed: May 21, 1976

[21] Appl. No.: 688,802

[52] U.S. Cl. .......................... 340/146.3 E; 250/227; 340/149 A
[51] Int. Cl.² ..................................... G06K 9/00
[58] Field of Search ............... 340/146.3 E, 149 A; 356/71; 250/221, 227, 578, 234–236

[56] References Cited

UNITED STATES PATENTS

| | | | |
|---|---|---|---|
| 3,231,861 | 1/1966 | French | 340/146.3 E |
| 3,576,537 | 4/1971 | Ernst | 340/149 A |
| 3,576,538 | 4/1971 | Miller | 340/146.3 E |
| 3,581,282 | 5/1971 | Altman | 340/146.3 E |
| 3,614,737 | 10/1971 | Sadowsky | 340/146.3 E |
| 3,648,240 | 3/1972 | Jacoby et al. | 340/146.3 E |
| 3,668,633 | 6/1972 | Sadowsky | 340/146.3 E |
| 3,801,823 | 4/1974 | Korn | 250/221 |
| 3,804,524 | 4/1974 | Jocoy et al. | 340/146.3 E |
| 3,864,042 | 2/1975 | Leventhal | 340/146.3 E |

FOREIGN PATENTS OR APPLICATIONS 1,304,555  1/1973  United Kingdom ......... 340/146.3 E

*Primary Examiner*—Leo H. Boudreau
*Attorney, Agent, or Firm*—Shelley M. Beckstrand

[57] ABSTRACT

A palm print identification system including a scanning probe translatable in contact with a human palm along a scan line. The probe may comprise one or more roller or drag probes, including light illumination and photodector means arranged to generate electrical signals representative of the pattern of palm lines. The spacing of palm lines as thus sensed is compared with a master read from an I.D. card or stored in a computer for I.D. verification.

11 Claims, 11 Drawing Figures

PALM PRINT IDENTIFICATION

BACKGROUND OF THE INVENTION

1. Field of the Invention

This invention relates to a system for identifying a human individual, and in particular to an automatic palm print identification system adapted to convert the pattern of palm lines into a unique identifying code number for identifying the user of a credit card or the like.

2. Description of the Prior Art

In recent years, with the increasing use of computer terminals including point of sale, access control, and self-service banking devices, and with the increasing concern for the security and integrity of data stored in a computer file accessed from such remote terminals, there is a need to provide means for assuring that unauthorized individuals not be permitted to access that data or otherwise obtain services, credit, cash or information available to authorized users of such devices.

Thus, there exists a need for a personal identity verification system which will assure that the individual seeking access to the files or approval of a transaction is an individual entitled to the information or service. Accordingly, it has been suggested that finger print or palm print characteristics of the individual be digitized and recorded in the computer or on an I.D. or bank card. Then, the individual seeking access to data or a facility, or approval for a transaction would present his finger or palm for scanning and comparison to data on the card or in the computer file.

In one prior art device, the individual places his palm down upon a flat surface forming one edge of a prism, and the illuminated pattern of skin ridges and valleys is scanned by a photodetector to generate an output signal pattern which is digitized for comparison with data read from the I.D. card. A disadvantage of such an approach is that the palm contour is such that the hand must be pressed with great force against the planar surface in order to render the palm lines visible to the photodetector. Also, some individuals just cannot press hard enough to achieve total contact between the palm and a planar surface. This force causes a distortion of the lines and makes it difficult to receive repeatable results from successive analysis of the same palm. Of course, it is undesirable to reject as not verified an individual who is indeed the authorized individual. Thus, the inability to read the same palm with repeatable results becomes an embarrassment to the individual who is rejected improperly.

Also, if the master pattern for comparison is digitized and recorded on the magnetic stripe of an I.D. card, it is impractical to record on the card digital representations of the many lines are on the palm or in a finger print. It would be highly desirable to be able to eliminate all except the darkest and most pronounced lines, so as to bring the total number of lines to be compared down to a low enough number that digital representations of them may be recorded in the limited space available in the magnetic stripe of the I.D. card.

Further, in scanning a palm to generate digital signals representative of the palm line spacing, the palm pattern generated is critically sensitive to the orientation of the hand with respect to the scan line, a slight inclination of the hand rendering the results between successive scannings signifcantly different. Consequently, it is desirable to provide a simple apparatus for scanning the palm lines which is not susceptible to slight variations in the orientation of the palm with respect to the scanning device.

SUMMARY OF THE INVENTION

This invention provides an improved apparatus for identifying an individual based upon the spacing of at least two preselected lines on a human palm. Scanning probe means translatable with respect to and in contact with a scan line on the palm is provided including transducer means for generating output signals representative of the pattern of skin ridges and valleys along that scan line.

In accordance with another aspect of the invention, sensing means for sensing the movement of the scanning probe means is provided for generating signals representative of the gross surface profile of the palm along the scan line. In accordance with a further aspect of the invention, the scanning probe means is adpated to follow a circular arc about a registration post positioned between two fingers of the palm being scanned.

BRIEF DESCRIPTION OF THE DRAWINGS

The foregoing and other objects, features and advantages of this invention will be apparent from the following description of the drawings in which.

DESCRIPTION OF THE PREFERRED EMBODIMENTS

Figure 1:
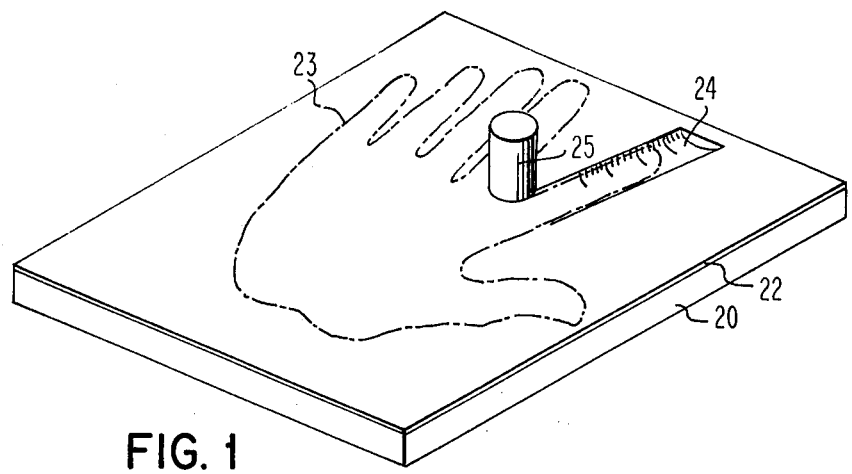
FIG. 1 is a schematic view of a palm registration device according to one aspect of the invention.

Referring now to the drawings, a description will be given of various embodiments of the invention for verifying the identity of an individual based upon the pattern of lines on his palm. (As used herein, the term "palm" includes the bottom of the fingers, along their entire length, for those aspects of the invention related to a rectilinear scan line.)

In FIG. 1 is illustrated the palm registration device for the circular scan embodiment of the invention. Base 20 is covered with a rubber palm line enhancing layer 22 in which may be provided a palm outline 23 to assist the individual in registering his palm as desired against registration post 25 with the index finger in registration slot 24.

Figure 2:
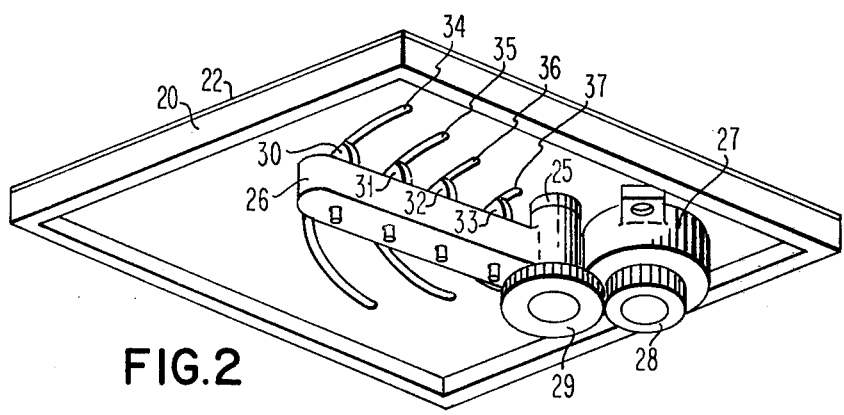
FIG. 2 is a diagrammatic view of a rotating palm scan apparatus.

In FIG. 2 the bottom of the scanning apparatus of FIG. 1 is shown. Illustrated is rotating scan arm 26 which is rotatably attached to registration post 25 which is mounted to base 20. Motor 27 drives rotating scan arm 26 through gears 28 and 29. Scanning probes 30–33 are individually mounted in rotating scan arm 26 and spring loaded up into scan slots 34–37 respectively where they engage the bottom surface of the rubber palm enhancing layer 22 or of the palm (if there is no layer 22).

After the individual has positioned his hand within outline 23 against post 25, motor 27 is actuated to cause rotation of scan arm 26 and, as will be explained more fully hereinafter, scanning probes 30–33 sense the pattern of palm skin lines for comparison with the master palm line pattern read from an I.D. card or stored in computer memory.

Figure 3:
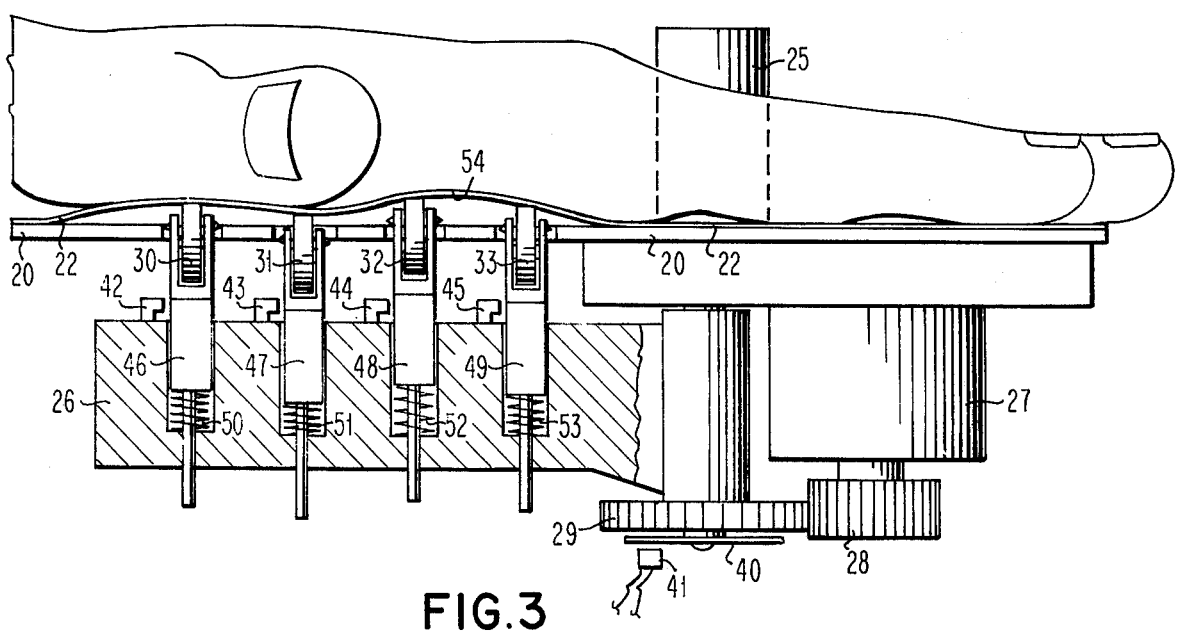
FIG. 3 is a schematic view of the rotating palm scan apparatus showing a plurality of roller probes and profile sensors.

In FIG. 3 a more detailed illustration is provided of scanning arm 26, together with the apparatus for measuring the gross palm profile and for defining the separation between palm lines. Mounted to registration post 25 for rotation with rotating scan arm 26 is position disc 40, timing marks on which are sensed by photocell 41 for generating signals representative of the angular position of scan arm 26 at each moment during its scanning rotation. Scanning probes 30–33 are individually mounted for rotation within mounts 46–49, which in turn are spring loaded by springs 50–53 so as to bring the upper surface of the respective scanning probe 30–33 into contact with palm line enhancing layer 22 at bottom surface 54 of the palm of the individual. Contour indicating photocells 42–45 sense the vertical motion of mounts 46–49, signals from which are used to provide a measure of the gross profile of the palm surface 54.

Figure 4:
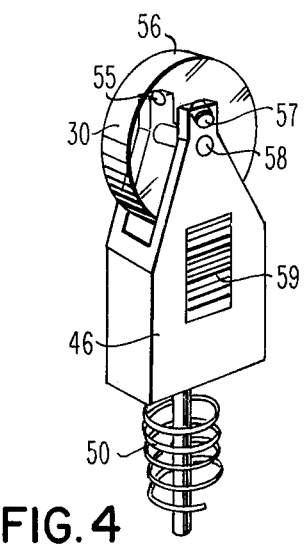
FIGS. 4 and 5 are schematic diagrams showing additional details of the roller probes of FIG. 3.
Figure 5:
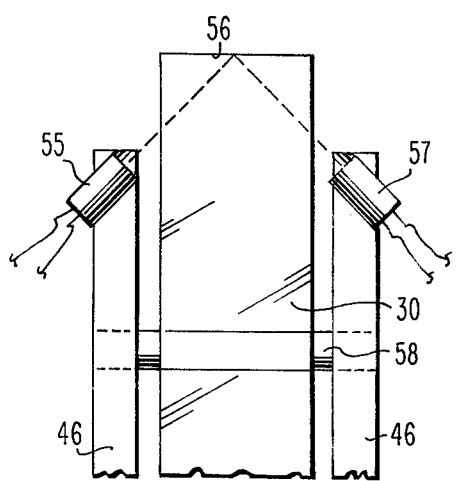

In FIG. 4 is illustrated in greater detail the scanning probe mount 46 together with scanning probe 30. Probe 30 comprises a roller of transparent material such as glass or *LUCITE (a polymethylmethacrylate of DuPont) and is rotatably attached to mount 46 by pin 55. Attached to mount 46 at one side of rotating probe 30 is light emitting diode 55 which is focused so as to illuminate through the side of roller 30 the inside of polished surface 56 of roller 30 where it engages the palm. Also in mount 46, located on the opposite side of roller 30 from light emitting diode 55, is photocell 57, which is also focused on surface 56 at the area of contact with palm 54. This relationship is also shown in FIG. 5, which illustrates light from LED 55 being reflected from surface 56 to photocell 57, which will occur when the palm skin is not in contact with the surface of rotating probe 30. This internal reflection is due to the difference in the indices of refraction between the air and the glass. However, when palm surface 54 is in contact with roller 30 at the area upon which is focused photocell 57, surface 56 no longer has the property of a reflective, mirror-like surface, and light from LED 55 is scattered. Consequently, photocell 57 does not detect the same, or high illumination from LED 55 as it did. When a palm line is crossed by roller 30, the skin at the line is not in contact with the roller surface; rather, there is a film of air separating the skin from the roller, and once again surface 56 acts as a mirror reflecting a high amount of light from LED 55 to photocell 57. This increase in light level is sensed and interpreted as a palm line. This variation in light received at photocell 57 due to the presence or absence of an air gap on surface 56 exists when the angle between surface 56 and the line of focusing of photocell 57 is less than the critical angle.

* A trademark of DuPont.

Referring again to FIG. 4, bar pattern 59 is provided on the surface of head 46, which pattern is detected by photocell 42 (FIG. 3) for indicating the vertical location of head 46 in providing an output representative of the gross palm contour.

Figure 6:
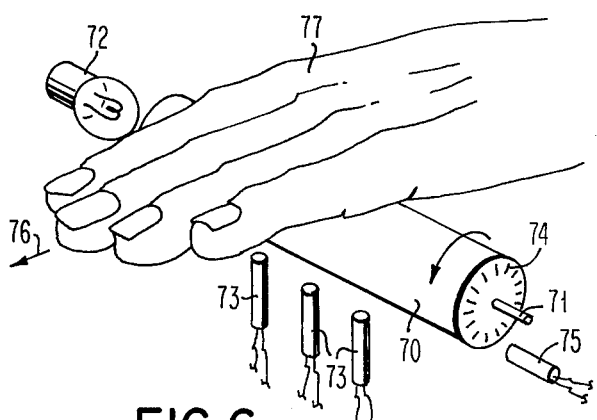
FIG. 6 is a schematic diagram showing a second embodiment of the invention.

In FIG. 6, a further embodiment of the invention is shown. Illustrated is solid glass or LUCITE rod 70 approximately 1 inch in diameter and 6 inches long, which is free to rotate about the axis defined by mounting axle 71, which in turn is mounted for rotation within a base (not shown). Light source 72 illuminates the inside of rod 70 through one end. A plurality of photocells 73 are positioned under rod 70 and focused on the inside of the top surface of said rod. On the opposite end from light 72 there is provided on rod 70 a plurality of timing marks 74 which are sensed by photo detector 75 for signaling the angular position of rod 70 as the hand rolls over the top of the rod in the direction of arrow 76. Normally, rod 70 acts as a light pipe and all of the light is transmitted down the length of the pipe from light 72 and none comes out of the sides to be detected by photo sensors 73. However, as hand 77 rolls over the scanning roller 70 and comes in contact therewith, light from source 72 is scattered at the points of contact with hand 77 by the principle of frustrated total internal reflection. This scattered light is sensed by photocells 73. Thus, as the hand is slid over the glass rod of roller 70, photocell 73 sensed the change in light as the skin comes into and out of contact with the surface of roller 70. Timing mark 74 is sensed by photocell 75 and used for measuring the distance the hand 77 has moved or, that is, how far rod 77 has rotated, as the various palm or finger lines are sensed by photo sensors 73.

Figure 7:
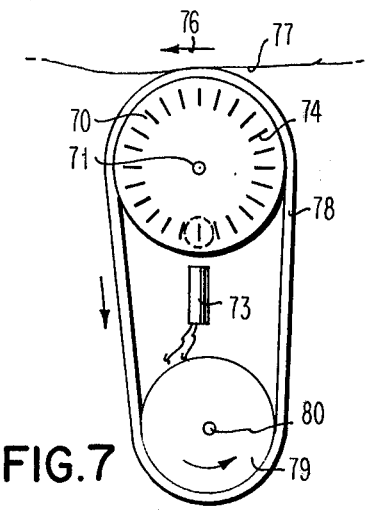
FIG. 7 illustrates a modification to the embodiment of FIG. 6 providing means for palm line enhancing.

In FIG. 7, the apparatus of FIG. 6 is shown with the addition of a rubber belt forming a wetting surface or palm line enhancing layer 78. Belt 78 engages the top of cylinder 70 and is drawn down and away from the bottom of said cylinder to provide space for photocells 73. For this purpose, belt 78 is wound about drum 79 which is mounted for rotation on pin 80. Thin rubber sheet 78 is placed over roller 70 in order to get a constant light output to photocell 73. This is done because skin varies in its dryness and color and, therefore, it varies in the degree of light frustration when it comes in contact with cylinder 70. The rubber layer 78 assists in making this parameter a constant. The thickness of layer 78 is selected so as to eliminate the presence of the very fine lines of the hand, in that the thicker the rubber, the smaller the resolution it transmits from one side to the other.

Figure 8:
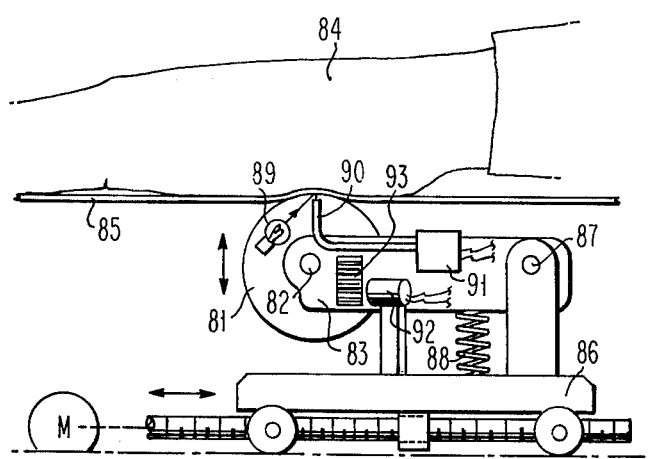
FIG. 8 is a schematic diagram of a third embodiment of the invention.

Referring now to FIG. 8, a further embodiment of the invention will be described. Herein, a plurality of scanning rollers 81 (only one of which is visible in this view) are mounted for rotation about pin 82 in arm 83, with each roller 81 mounted to a separate arm 83. Hand 84 is placed on plate 85, in which a slot is provided to allow roller 81 to engage the bottom of hand 84. Arm 83 is mounted to carriage 86 by pin 87 and spring loaded by spring 88 up into engagement with the bottom of palm 84. After the palm is placed on plate 85, carriage 86 is translated by motive means not shown such that roller 81 translates a linear line across the bottom of the palm. In a manner similar to that illustrated in FIG. 5, light source 89 illuminates the inside surface of polished roller 81 at the region of contact with palm 84. Light reflected from the inside surface is picked up by light pipe 90 and transmitted to photocell 91 which provides an output representative of the pattern of lines in the palm of hand 84. Photocell 92 is adapted to sense bar pattern 93 on the side of arm 83 for sensing the vertical motion of roller 81 to provide an output indicative of the gross contour of the palm.

Figure 9:
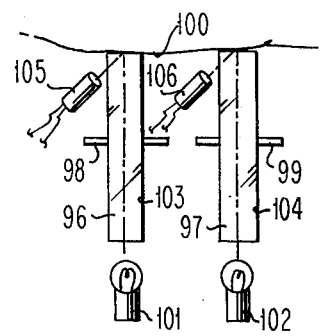
FIG. 9 is a schematic diagram illustrating in greater detail another type of scanning probe.

In FIG. 9 is illustrated a further embodiment of a scanning probe adapted for use in the invention. Herein, glass or LUCITE rollers 96 and 97 are each mounted for rotation about axes 98 and 99, respectively, and loaded upward into the surface of palm 100, in a manner which would be obvious to those skilled in the art. Light sources 101 and 102 illuminate the palm by shining upward through rollers 96, 97. The sides of rollers 96, 97 are blackened at 103, 104 to provide a dark surface for photocells 105 and 106 to focus against when the top inside surface of polished rollers 96 and 97, respectively, act as internal reflectors. Surfaces 96, 97 act as reflectors to photocells 105, 106 when there is air in contact with them. As shown, when palm 100 is in contact with the surface of roller 96 photocell 105 "sees" the light from source 101 which is reflected down into photocell 105. On the other hand, when the surface of palm 100 is not in contact with roller 97 because of the presence of palm line, light from source 102 does not reach photocell 106 because of the internal reflection caused by the air gap between palm 100 and roller 97. Consequently, photocell 106 sees only the darkened surface 104. In this manner, photocells 105 and 106 are enabled to provide an output distinguishing the skin lines of palm 100.

As illustrated, FIG. 9 shows scanning probes 96 and 97 mounted for rotation about axes 98 and 99 respectively. This would be the preferred manner of mounting scanning probes 96 and 97, inasmuch as the rollers move across the palm or bottom of the finger minimal distortion of the skin will result. However, in those circumstances where a little distortion can be permitted the apparatus is simplified by fixing probes 96 and 97 against rotation and merely dragging them along palm surface 100. In this configuration, it would not be necessary that scanning probes 96, 97 be wheels, but rather a pencil-like probe would be acceptable. Such a probe could be mounted in an apparatus such as that illustrated in FIG. 8 or in FIG. 3, for loading against the palm, as would be apparent to those skilled in the art.

Figure 10:
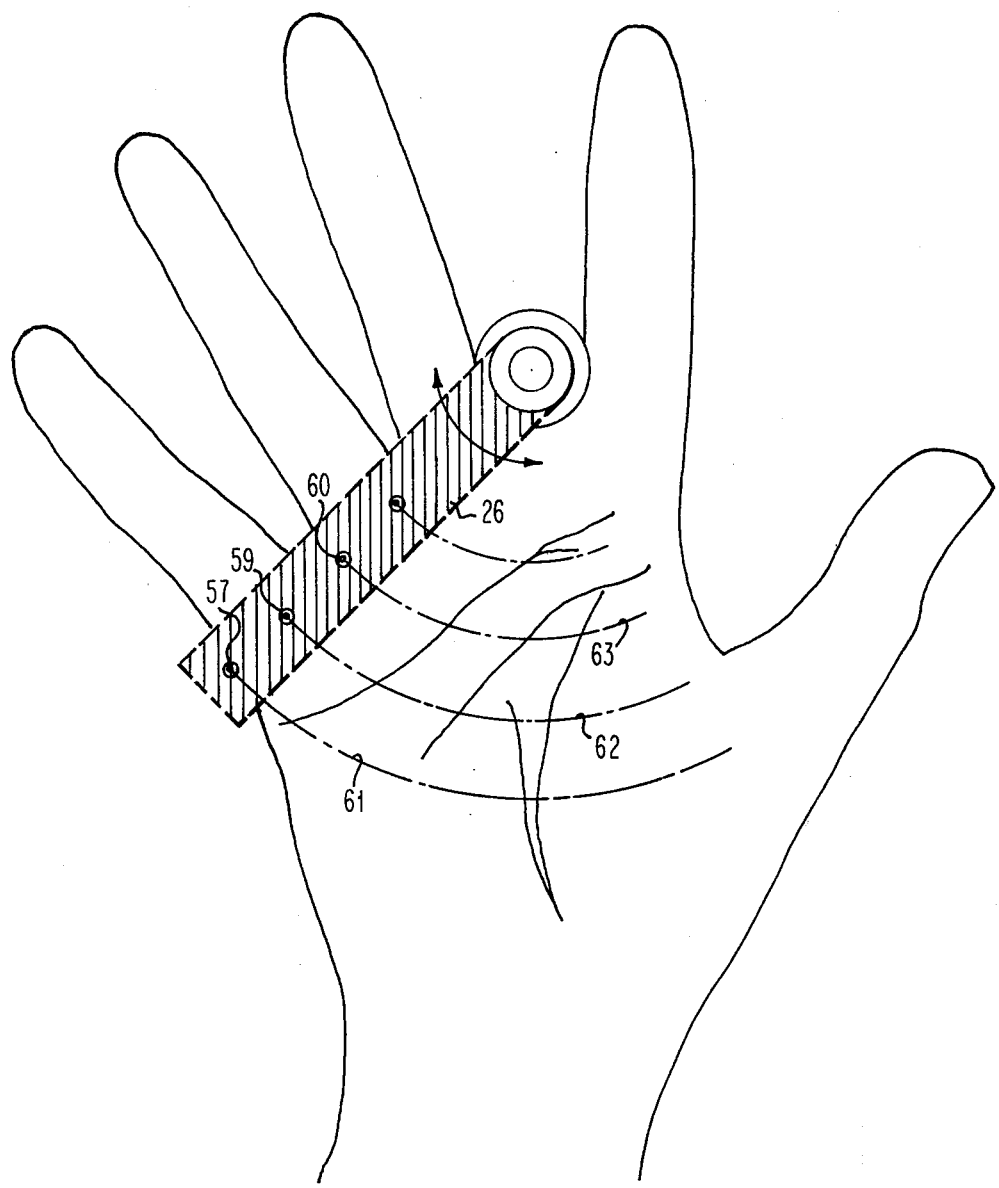
FIG. 10 is a diagrammatic view of a human palm for illustrating the manner in which the palm lines are scanned using a rotating scanner.
Figure 11:
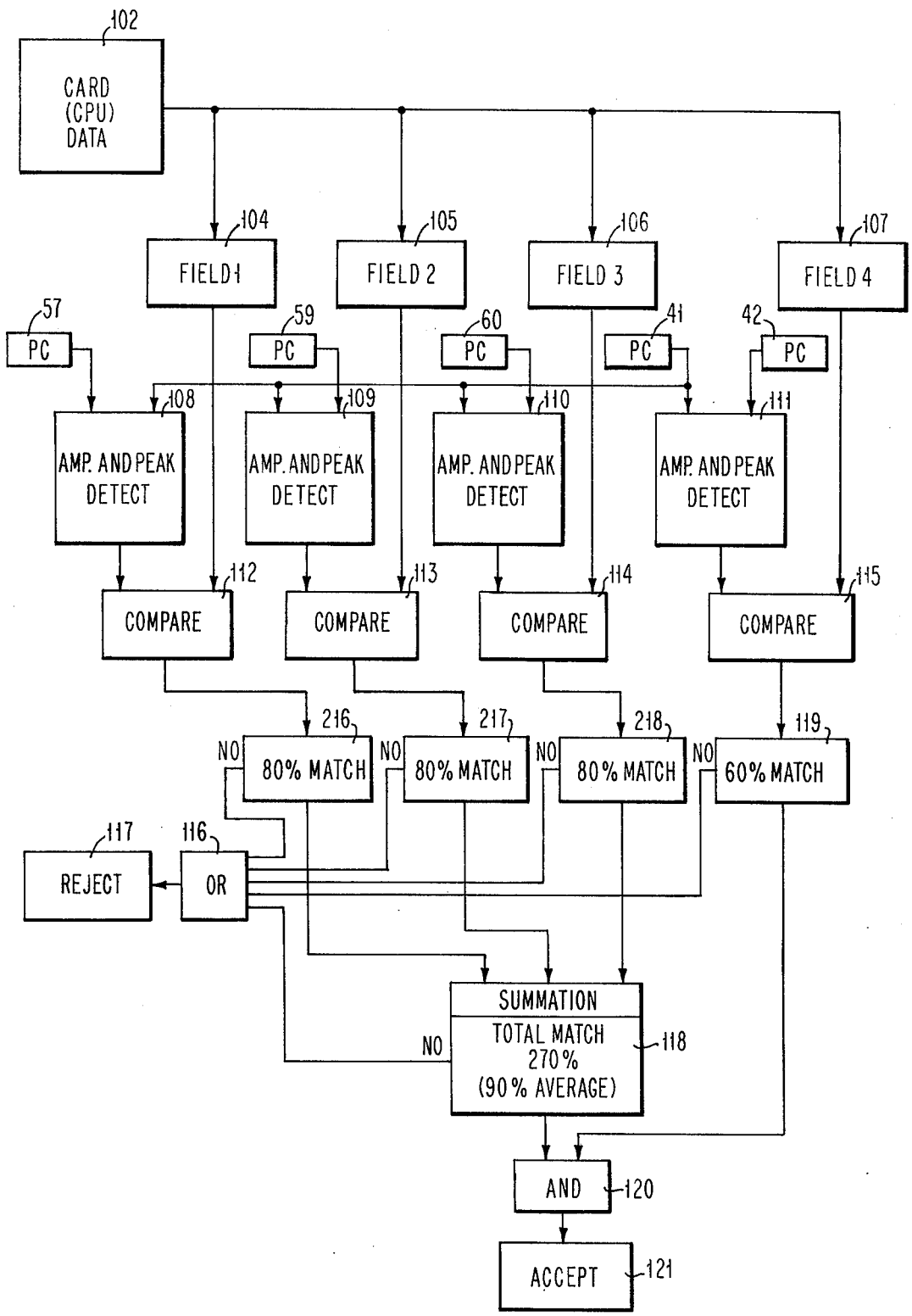
FIG. 11 is a logic diagram illustrating one approach for accepting or rejecting an individual base upon comparison of palm lines and palm contour data sensed from the palm of the individual with those of a master record.

Referring now to FIGS. 10 and 11, a technique for verifying the identity of an individual based upon the palm line pattern and the palm contour will be described.

Stored on the individual's identification card 102 are, for example, four fields of data — which are read from card 102 and stored in registers 104-107 by transducer means (not shown). Data in card 102 may be stored in magnetic, optical, punched, or any other convenient form — as will be apparent to those skilled in the art. Field 1 data, stored in register 104, is data related to scan line 61 and represents the distance, in say millimeters (mm) of the second, third, fourth, and fifth lines along scan line 61 (of FIG. 10) from the first line. Similarly, field 2 data represents the spacing of palm lines along scan line 62, and field 3 along scan line 63. These distances may be for, say, the four most pronounced lines — all other lines being eliminated by electronic filtering and/or by the skin wetting effect of layer 22 (FIG. 1). Field 4 data, stored in register 107, represents, in millimeters, the difference between the peaks and valleys with respect to a base of the palm along, say, scan line 61. Said base may represent the position of detector assembly 46 as determined by photocell 42 on the first peak encountered along scan line 61, or its position when the first palm line is encountered during scanning along line 61.

Photocells 57, 59 and 60 scan the palm of the individual along scan lines 61, 62, 63 respectively, and provide an analog signal output to amplifier and peak detectors 108, 109, 110 respectively, representing the skin lines in the palm intersecting said scan lines. As peak detector 108 detects a skin line, its spacing from the reference (which may be the heart line, or first line encountered) is computed and provided to compare circuit 112. Field 1 data from register 104 is also available to compare circuit means 112, where it is compared with the output of detector 108 to determine if the line read from the palm matches (within a tolerance of, say, ± 1 mm) with that recorded in field 1 read from card 102 (or stored in a computer file). This is repeated for each skin line recorded in register 1. Match circuits 216–218 receive the output of compare circuits 112–114, respectively, and signal whether or not a predetermined fraction of the skin lines recorded in fields 1–3 were also detected by photocells 57, 59, 60 during scanning of the palm of the individual being tested. If any of matching circuits 216–218 indicate a failure to match the predetermined fraction or percentage of the lines, then OR gate 116 provides reject signal 117. An optional additional check is made in summation circuit 118 if all of match circuits 216–218 signal a match at said predetermined fraction, where the summation of all successful compares in 112–114 is tested against a second threshold, or predetermined percentage of skin lines matching along all scan lines. Failure of summation check 118 also causes OR circuit 116 to provide reject signal 117, whereas a successful summation check 118 enables AND gate 120 to provide accept signal 121. Alternatively, the successful match outputs of match circuits 216–218 can be fed directly to AND gate 120.

The palm contour check is made in compare circuit 115, where the palm distances from a base for the palm peaks and valleys stored in register 107 are compared with those generated by photocell 42 as digitized by detector 111. Match circuit 119 signals whether a predetermined percentage of the peaks and valleys of the palm recorded on card 102 compare within a tolerance of, say, ± 2 mm, with those detected by photocell 42 and detector 111. If not, OR gate is enabled to provide reject signal 117. Otherwise, AND gate 120 is enabled to provide accept signal 121. Obviously, the contour check described here for just one scan line can be performed on a plurality of scan lines.

While the invention has been described in connection with preferred embodiments thereof, it will be apparent to those skilled in the art that the foregoing and other changes may be made without departing from the scope and intent of the invention.

What is claimed is:

1. Apparatus for characterizing an individual based upon the spacing of at least two preselected lines on a human palm, comprising scanning probe means translatable with respect to a scan line and in contact with a surface of said palm;

said scanning probe means including transducer means for generating output signals representative of the pattern of skin lines along said scan line; and transducer means responsive to the movement of said scanning probe means normal to said scan line for generating output signals representative of the gross surface profile of the palm along said scan line.

2. The apparatus of claim 1 wherein said scanning probe means comprises an internal reflection member translatable in contact with said palm along said scan line without rolling.

3. The apparatus of claim 1 wherein a plurality of scanning probe means are provided, each one individually loaded into contact with said palm and translatable with respect to parallel scan lines for generating a plurality of output signals representative of the skin lines crossing said scan lines.

4. The apparatus of claim 1 wherein said surface of said palm comprises a line enhancing member for positioning in juxtaposition to said human palm.

5. Apparatus for characterizing an individual based upon the spacing of at least two preselected lines on a human palm, comprising
scanning probe means including at least one internal reflection member having a cylindrical shape and being mounted for rolling along a scan line across the surface of the palm; and
transducer means for generating output signals representative of the pattern of palm skin lines crossing said scan line.

6. The apparatus of claim 5 wherein said scanning probe means is a light pipe, and further comprising light source means for illuminating said light pipe from one end, and said transducer means comprises a plurality of photo detectors focused through said light pipe onto the internal surface of contact of said light pipe with said palm.

7. The apparatus of claim 5 wherein said surface of the palm comprises a line enhancing member for positioning in juxtaposition to said human palm.

8. Apparatus for characterizing an individual based upon the spacing of at least two preselected lines on a human palm, comprising
scanning probe means translatable with respect to a scan line and in contact with a surface of said palm said scanning probe means including transducer means for generating output signals representative of the pattern of skin lines along said scan line;
post registration means; and
rotating scan arm means rotatable about said registration means for holding said scanning probe means, and motive means for rotating said scan arm means such that said scanning probe means follows a circular scan line.

9. The apparatus of claim 8 wherein said surface of said palm comprises a line enhancing member for positioning in juxtaposition to said human palm.

10. Apparatus for identifying an individual based upon the spacing of at least two preselected lines on a human palm, comprising:
internal reflection head means translatable with respect to the surface of said palm for contact traversing a scan line;
registration means for registering the palm with respect to said scan line;
a source of light illuminating said head means at the area of contact with said surface of said palm;
photodetector means responsive to light reflected from said surface of said palm through said head means for providing an output signal representative of the palm line pattern;
means for storing a comparison signal representative of a known individual; and
means for comparing said output signal and said comparison signal to test the identity of the individual presenting said palm.

11. The apparatus of claim 10 wherein said surface of said palm comprises a line enhancing member for positioning in juxtaposition to said human palm.

* * * * *